US009094290B2

(12) United States Patent
Choy et al.

(10) Patent No.: US 9,094,290 B2
(45) Date of Patent: Jul. 28, 2015

(54) MEASURING AND DISPLAYING BANDWIDTH CONTENTION

(75) Inventors: Laura Choy, Vancouver (CA); Earl Chew, Vancouver (CA); Michael Hutchison, Richmond (CA)

(73) Assignee: Ixia, Calabasas, CA (US)

( * ) Notice: Subject to any disclaimer, the term of this patent is extended or adjusted under 35 U.S.C. 154(b) by 965 days.

(21) Appl. No.: 13/229,584

(22) Filed: Sep. 9, 2011

(65) Prior Publication Data

US 2013/0063441 A1  Mar. 14, 2013

(51) Int. Cl.
H04L 1/24 (2006.01)
H04L 12/54 (2013.01)
H04L 12/801 (2013.01)
H04L 12/26 (2006.01)
G09G 5/22 (2006.01)
G09G 5/00 (2006.01)

(52) U.S. Cl.
CPC .......... H04L 43/045 (2013.01); H04L 43/0876 (2013.01); G09G 5/005 (2013.01); G09G 2350/00 (2013.01); G09G 2370/02 (2013.01); G09G 2370/10 (2013.01)

(58) Field of Classification Search
CPC ............... H04L 47/00; H04L 47/10–47/41; H04L 47/50–47/60; H04L 47/62–47/6295; H04L 47/70–47/829; H04L 12/5689; H04L 12/569; H04L 12/5693–12/5696; H04L 1/24–1/248; H04L 43/045; H04L 43/0876; H04W 4/00–4/10; H04W 16/22; H04W 16/225; H04W 40/00; H04W 40/02; H04W 40/18; G09G 2350/00; G09G 2370/02; G09G 2370/10; G09G 5/005

USPC .......... 345/440–440.2; 347/19; 370/229–253, 370/351–427
See application file for complete search history.

(56) References Cited

U.S. PATENT DOCUMENTS

| 6,578,077 | B1 | 6/2003 | Rakoshitz et al. | |
|---|---|---|---|---|
| 7,248,564 | B1 * | 7/2007 | Grosdidier et al. | 370/235 |
| 8,024,438 | B2 * | 9/2011 | Bedingfield et al. | 709/223 |
| 2001/0031925 | A1 * | 10/2001 | Mika et al. | 600/510 |
| 2002/0169880 | A1 * | 11/2002 | Loguinov et al. | 709/228 |
| 2005/0169312 | A1 * | 8/2005 | Cakareski et al. | 370/473 |
| 2005/0249206 | A1 * | 11/2005 | Wybenga et al. | 370/389 |
| 2006/0233108 | A1 * | 10/2006 | Krishnan | 370/235 |
| 2007/0070896 | A1 * | 3/2007 | Alapuranen et al. | 370/230 |
| 2007/0115848 | A1 * | 5/2007 | Chean et al. | 370/252 |
| 2009/0003282 | A1 * | 1/2009 | Meylan et al. | 370/331 |
| 2011/0110260 | A1 * | 5/2011 | Yoneda et al. | 370/252 |
| 2011/0134766 | A1 * | 6/2011 | Zampetti et al. | 370/252 |
| 2011/0149751 | A1 * | 6/2011 | Li et al. | 370/252 |
| 2011/0293250 | A1 * | 12/2011 | Deever | 386/290 |

OTHER PUBLICATIONS

Ravi Prasad and Constantinos Dovrolis, Margaret Murray, KC Claffy, Bandwidth Estimation: Metrics, Measurement Techniques, and Tools, 2003, IEEE Network, 17(6):27-35.*

* cited by examiner

*Primary Examiner* — Xiao Wu
*Assistant Examiner* — Michael J Cobb
(74) *Attorney, Agent, or Firm* — SoCal IP Law Group LLP; John E. Gunther; Steven C. Sereboff

(57) ABSTRACT

Methods and test systems for reporting transmit bandwidth contention. A histogram representing transmit bandwidth demand for a network device may be built, the histogram including a plurality of bins representing for a plurality of contiguous time intervals of equal duration including a current time bin and plural future time bins. The histogram may be displayed and periodically updated.

14 Claims, 6 Drawing Sheets

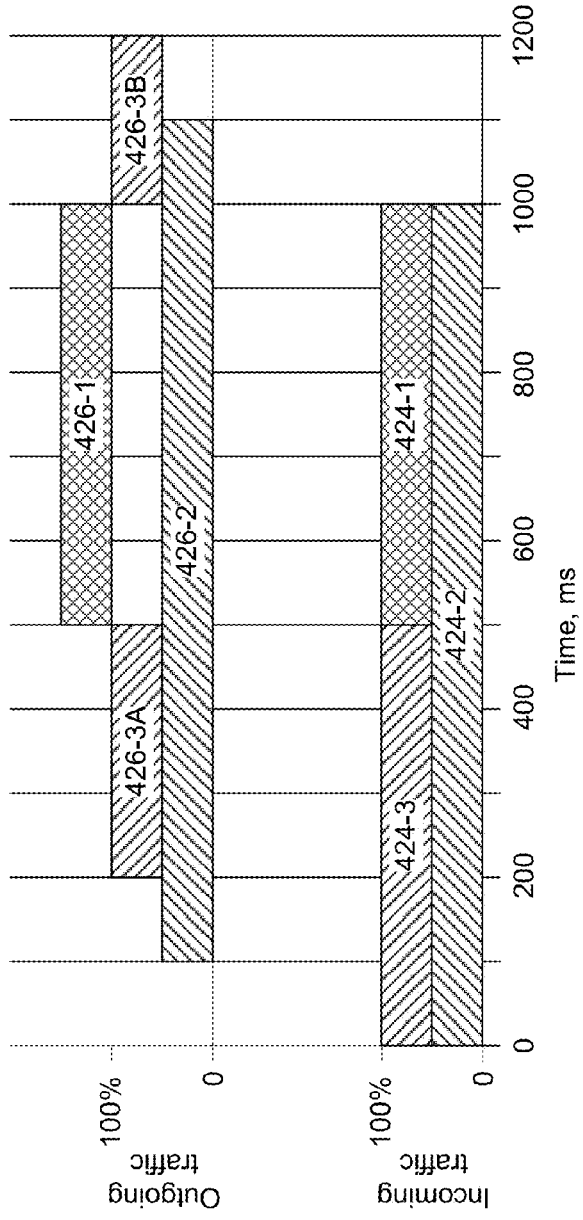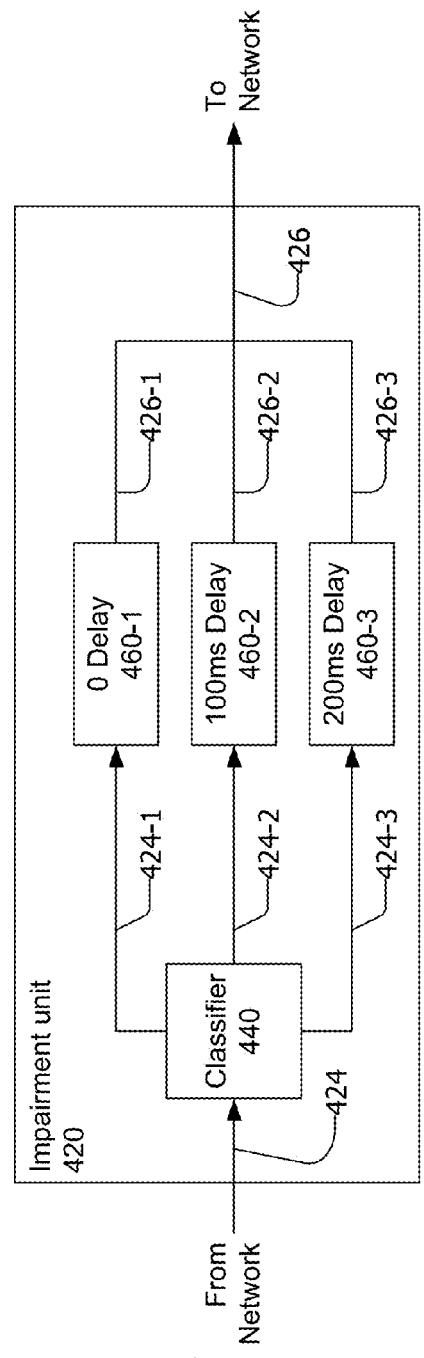
FIG. 4C
FIG. 4B
FIG. 4A

MEASURING AND DISPLAYING BANDWIDTH CONTENTION

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to generating connections for testing a network or network device.

2. Description of the Related Art

In many types of communications networks, each message to be sent is divided into portions of fixed or variable length. Each portion may be referred to as a packet, a frame, a cell, a datagram, a data unit, or other unit of information, all of which are referred to herein as packets.

Each packet contains a portion of an original message, commonly called the payload of the packet. The payload of a packet may contain data, or may contain voice or video information. The payload of a packet may also contain network management and control information. In addition, each packet contains identification and routing information, commonly called a packet header. The packets are sent individually over the network through multiple switches or nodes. The packets are reassembled into the message at a final destination using the information contained in the packet headers, before the message is delivered to a target device or end user. At the receiving end, the reassembled message is passed to the end user in a format compatible with the user's equipment.

Communications networks that transmit messages as packets are called packet switched networks. Packet switched networks commonly contain a mesh of transmission paths which intersect at hubs or nodes. At least some of the nodes may include a switching device or router that receives packets arriving at the node and retransmits the packets along appropriate outgoing paths. Packet switched networks are governed by a layered structure of industry-standard protocols.

Layer 1 protocols define the physical (electrical, optical, or wireless) interface between nodes of the network. Layer 1 protocols include various Ethernet physical configurations, the Synchronous Optical Network (SONET) and other optical connection protocols, and various wireless protocols such as Wi-Fi.

Layer 2 protocols govern how data is logically transferred between nodes of the network. Layer 2 protocols include the Ethernet, Asynchronous Transfer Mode (ATM), Frame Relay, and Point to Point Protocol (PPP).

Layer 3 protocols govern how packets are routed from a source to a destination along paths connecting multiple nodes of the network. The dominant layer 3 protocols are the well-known Internet Protocol (IP) version 4 (IPv4) and version 6 (IPv6). A packet switched network may need to route IP packets using a mixture of the Ethernet, ATM, FR, and/or PPP layer 2 protocols. At least some of the nodes of the network may include a router that extracts a destination address from a network layer header contained within each packet. The router then used the destination address to determine the route or path along which the packet should be retransmitted. A typical packet may pass through a plurality of routers, each of which repeats the actions of extracting the destination address and determining the route or path along which the packet should be retransmitted.

In order to test a packet switched network or a device included in a packet switched communications network, test traffic comprising a large number of packets may be generated, transmitted into the network at one or more ports, and received at different ports. In this context, the term "port" refers to a communications connection between the network and the equipment used to test the network. The term "port unit" refers to a module within the network test equipment that connects to the network at a port. The received test traffic may be analyzed to measure the performance of the network. Each port unit connected to the network may be a source of test traffic, a destination for test traffic, or both a source of and a destination for test traffic. Each port unit may emulate a plurality of logical source or destination addresses. The number of port units and the communications paths that connect the port units to the network are typically fixed for the duration of a test session. The internal structure of the network may change during a test session, for example due to failure of a communications path or hardware device.

In order to test the capability of a network to survive or overcome a failure or other condition that impairs the performance of the network, impairments may be controllably introduced into the network. For example, voice over internet protocol (VoIP) networks may execute packet loss concealment strategies to replace packets that are lost during transmission over the network. To test such capability, a programmable impairment unit may be introduced into the network to cause a controlled number of packets to be dropped during transmission. An impairment unit may introduce other forms of impairment such as, for example, delaying packets for a fixed or randomly variable time period, reordering packets, introducing bit errors, duplicating packets, and other impairments.

For the purpose of collecting test data, the test traffic for each traffic item may be organized into packet groups, where a "packet group" is any plurality of packets for which network traffic statistics are accumulated. The packets in a given packet group may be distinguished by a packet group identifier (PGID) contained in each packet. The PGID may be, for example, a dedicated identifier field or combination of two or more fields within each packet.

For the purpose of reporting network traffic data, the test traffic for each traffic item may be organized into flows, where a "flow" is any plurality of packets for which network traffic statistics are reported. Each flow may consist of a single packet group or a small plurality of packet groups. Each packet group may typically belong to a single flow.

Within this description, the term "logic circuit" means a collection of hardware, which may be augmented by firmware and/or software, which performs a described function or set of functions. The term "logic circuit" encompasses combinatorial logic and sequential logic such as, for example, state machines. All or portions of a "logic circuit" may be implemented by a micro-controller or other processor. Logic circuits may typically be designed using a hardware description language (HDL) that defines the logic circuits primarily in functional terms. The HDL design may be verified using an HDL simulation tool. The verified HDL design may then be converted into a gate netlist or other physical description of the logic circuits in a process commonly termed "synthesis". The synthesis may be performed automatically using a synthesis tool. The gate netlist or other physical description may be converted into process instructions and masks for fabricating the engine within an application specific integrated circuit (ASIC).

A gate netlist or other physical description of logic circuits may be further converted into configuration data for implementing the logic circuits in a field programmable gate array (FPGA), a programmable logic device (PLD), or a programmable logic arrays (PLA), or other programmable semiconductor device, all of which will be referred to herein as "programmable circuit devices". Configuration data for programming a programmable circuit device may be stored in a memory or a machine readable storage medium and used to configure a programmable circuit device upon power-up of a test system. In this patent, the term "machine readable storage medium" means a non-transitory medium for storing digital data. Examples of machine readable storage media include optical discs such as CD-ROM, CD-RW, and DVD discs; magnetic medium such as hard and flexible magnetic discs and magnetic tape; and nonvolatile semiconductor devices such as read-only and flash memories. The term "machine readable storage medium" is not intended to encompass transitory media such as signals and waveforms that may convey digital data.

Within this description, the terms "unit" and "engine" also means collections of hardware, which may be augmented by firmware and/or software, which may be on a larger scale or have a more focused function than a "logic circuit". The terms "logic circuit", "unit" and "engine" do not imply any physical separation or demarcation. All or portions of one or more logic circuits, units, and/or engines may be collocated on a common card, such as a network card or within a common programmable circuit device, ASIC, or other circuit device.

DESCRIPTION OF THE DRAWINGS

FIG. 4A is a logical block diagram of an impairment unit.
FIG. 4B is a graph of incoming traffic versus time.
FIG. 4C is a graph of outgoing traffic versus time.

Throughout this description, elements appearing in figures are assigned three-digit reference designators, where the most significant digit is the figure number where the element is introduced and the two least significant digits are specific to the element. An element that is not described in conjunction with a figure may be presumed to have the same characteristics and function as a previously-described element having the same reference designator.

In block diagrams, arrow-terminated lines may indicate data paths rather than signals. Each data path may be multiple bits in width. For example, each data path may consist of 4, 8, 16, 64, 256, or more parallel connections.

Detailed Description

Description of Apparatus

Figure 1:
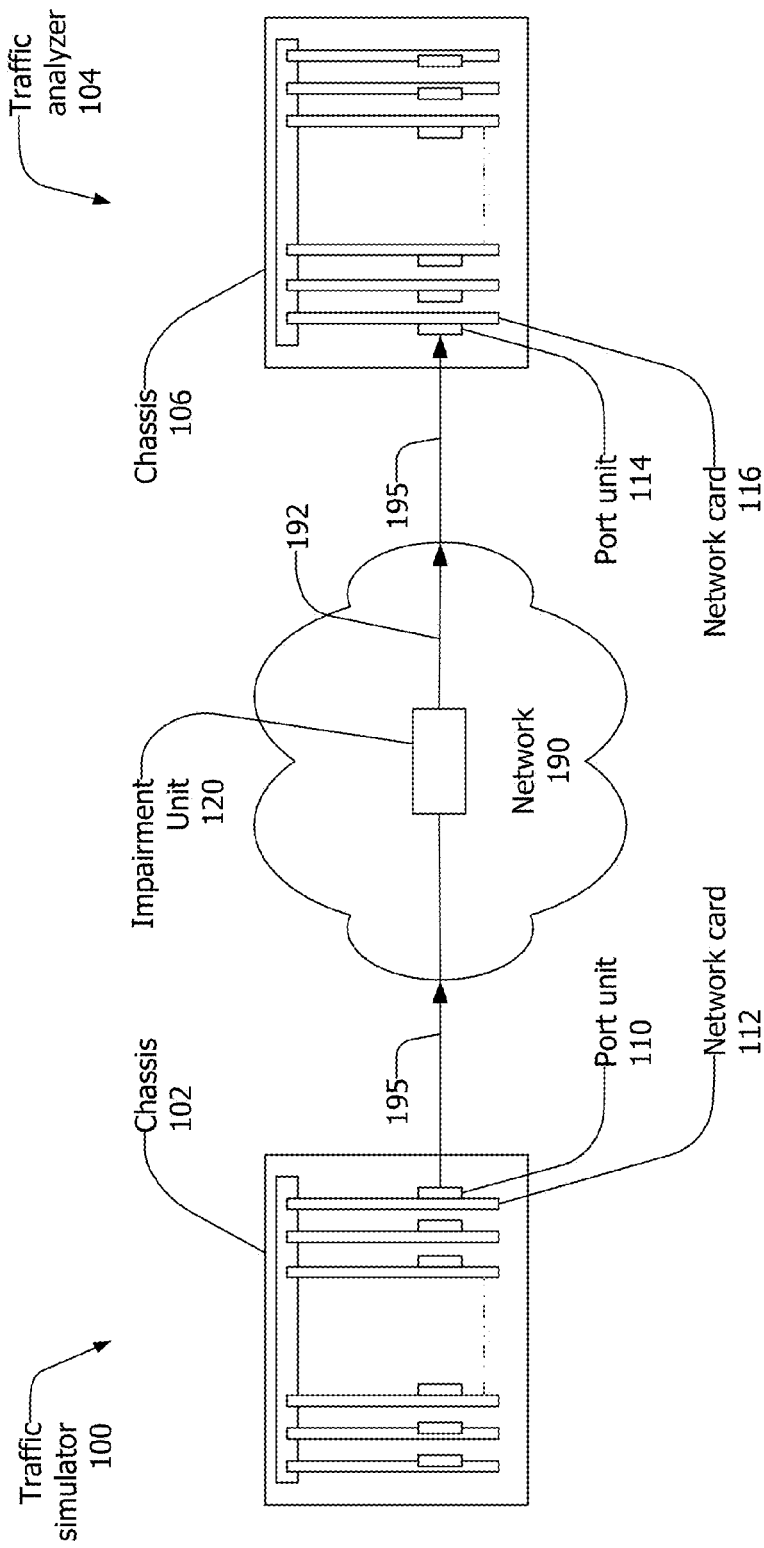
FIG. 1 is a block diagram of a network environment.

FIG. 1 shows a block diagram of a network test environment. The network test environment may include a traffic simulator 100, a traffic analyzer 104, and a network 190. One or more impairment units 120 may be introduced into the network 190. The traffic simulator 100 may generate test traffic that is received by the traffic analyzer 104 via the network 190. The traffic simulator 100 and the traffic analyzer 104 may be separate physical units, as shown, or may be combined in a single unit that both generates and receives test traffic.

The traffic simulator 100 may be a network test device, performance analyzer, conformance validation system, network analyzer, or network management system. The traffic simulator 100 may be a portion of the network 190 or a device within the network 190 performing self-testing. The traffic simulator 100 may include one or more network cards 112 enclosed within a chassis 102. The chassis 102 may be a fixed or portable chassis, cabinet, or enclosure suitable to contain the network test equipment. The traffic simulator 100 may be an integrated unit, as shown in FIG. 1. Alternatively, the traffic simulator 100 may comprise a number of separate units cooperative to provide traffic generation and/or analysis.

The traffic analyzer 104 may be a network test device, performance analyzer, conformance validation system, network analyzer, or network management system. The traffic analyzer 104 may be a portion of the network 190 or a device within the network 190 performing self-testing. The traffic analyzer 104 may include one or more network cards 116 enclosed within a chassis 106. The chassis 106 may be a fixed or portable chassis, cabinet, or enclosure suitable to contain the network test equipment. The traffic analyzer 104 may be an integrated unit, as shown in FIG. 1. Alternatively, the traffic analyzer 104 may comprise a number of separate units cooperative to provide traffic generation and/or analysis.

The network cards 112/116 may be permanently installed in the traffic simulator 100 and traffic analyzer 104 or may be removable. The network cards 112/116 may include one or more field programmable gate arrays (FPGAs), application specific integrated circuits (ASICs), programmable logic devices (PLDs), programmable logic arrays (PLAs), processors, and other kinds of programmable circuit devices. In addition, the network cards 112/116 may include software and/or firmware. The term network card encompasses line cards, test cards, analysis cards, network line cards, load modules, interface cards, network interface cards, data interface cards, packet engine cards, service cards, smart cards, switch cards, relay access cards, and the like. The term network card also encompasses modules, units, and assemblies that may include multiple printed circuit boards.

Each network card 112/116 may contain one or more port unit 110/114. Each port unit 110/114 may connect to the network 190 through one or more ports. Each port unit 110/114 may be connected to the network 190 through a communications link 195, which may be a wire, an optical fiber, a wireless link, or other communications link. Each network card 112/116 may support a single communications protocol, may support a number of related protocols, or may support a number of unrelated protocols.

The network 190 may be a Local Area Network (LAN), a Wide Area Network (WAN), a Storage Area Network (SAN), wired, wireless, or a combination of these, and may include or be the Internet. Communications on the network 190 may take various forms, including frames, cells, datagrams, packets or other units of information, all of which are referred to herein collectively as "traffic" and individually as "packets". The network 190 may be comprised of numerous nodes interconnected by a mesh of communications paths, providing numerous physical and logical paths for data to travel. There may be plural logical communications paths between the traffic simulator 100 and the traffic analyzer 104.

The impairment unit 120 may be a separate physical device or a portion of one of the traffic simulator 100 and the traffic analyzer 104. The impairment unit 120 may be remotely located from the traffic simulator 100 and/or the traffic analyzer 104. The impairment unit 120 may be introduced into a designated communications path 192 within the network 190 such that at least some of the traffic from the traffic simulator 100 to the traffic analyzer 104 flows through the impairment unit 120. The impairment unit 120 may selectively impair some or all of the traffic that flows along the designated communications path 192. For example, the impairment unit 120 may selectively drop, delay, reorder, duplicate, and/or alter at least some packets that flow along the designated communications path 192.

The designated communications path 192 may be unidirectional, as shown in FIG. 1, or may be bidirectional. If the designated communications path 192 is bidirectional, the impairment unit 120 may be configured to selectively impair packets traveling in either direction (i.e. from left-to-right or right-to-left as shown in FIG. 1) along the designated communications path.

Figure 2:
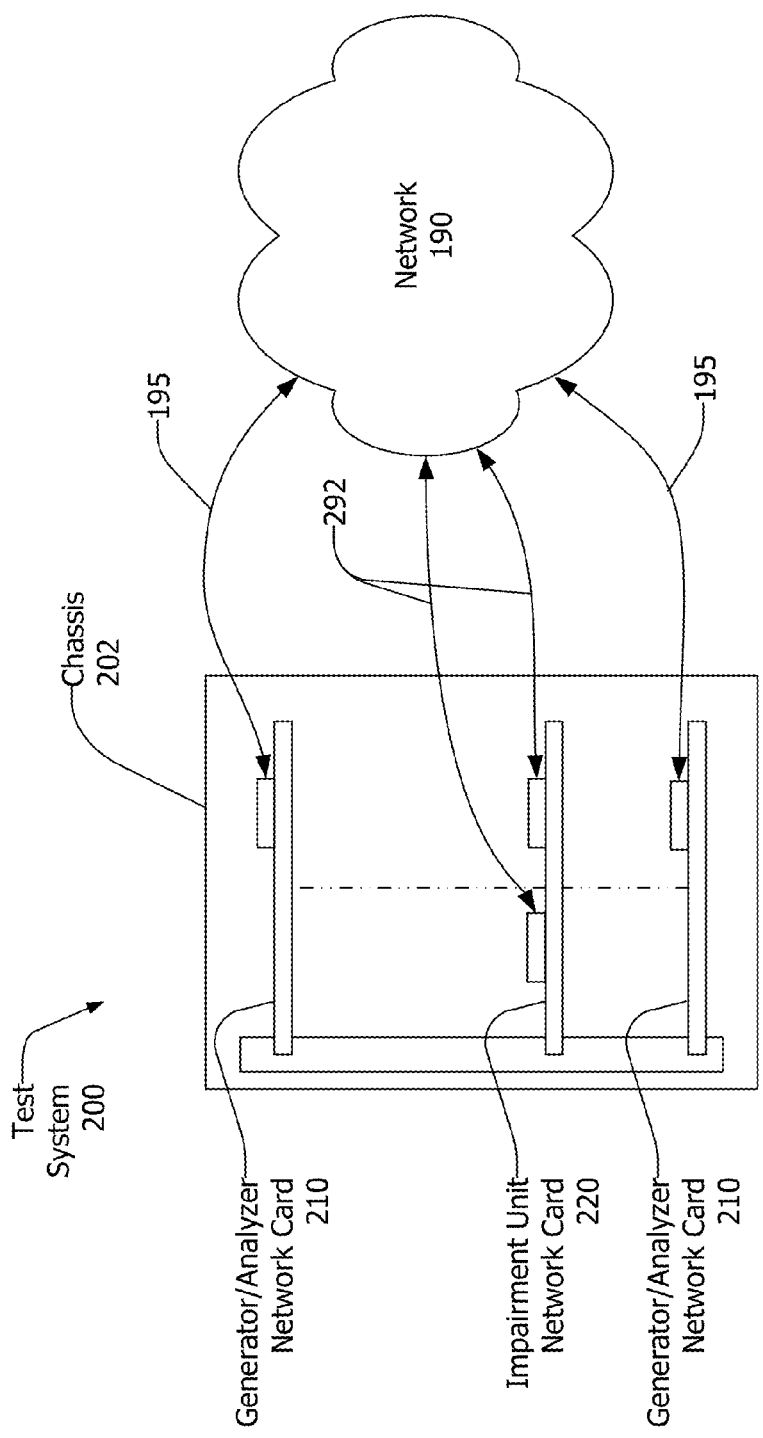
FIG. 2 is a block diagram of a network environment.

Referring now to FIG. 2, another network test environment may include a test system 200 coupled to the network 190. The test system 200 may include a plurality of generator/analyzer network cards 210 enclosed within a chassis 202. Each generator/analyzer network card 210 may include one or more port units connected to the network 190 via respective bidirectional communications links 195. At least some of the generator/analyzer network cards 210 may generate test traffic for transmission via the network 190. At least some of the generator/analyzer network cards 210 may receive and analyze test traffic from the network 190. Some or all of the generator/analyzer network cards 210 may both generate and analyze test traffic. The plurality of generator/analyzer network cards 210 may collectively perform the functions of the traffic simulator 100 and traffic analyzer 104 of FIG. 1.

The test system 200 may include one or more impairment unit network cards 220. The impairment unit network card 220 may include two ports connected to the network 190 by a pair of communications links 292. In effect, a designated communications path within the network 190 may be broken and connected to the two ports of the impairment unit network card 220. The communications links 292 may be unidirectional or bidirectional, in which case the impairment unit network card 220 may be configured to selectively impair packets traveling in either or both directions.

Figure 3:
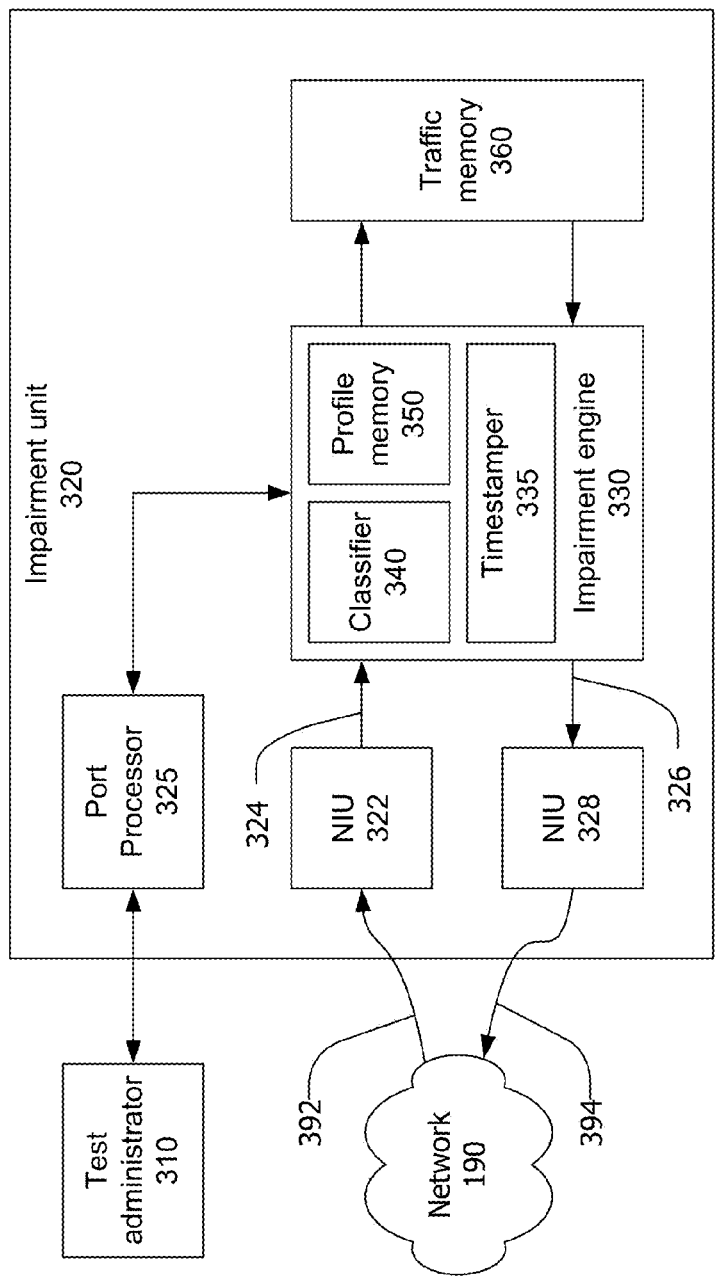
FIG. 3 is a schematic block diagram of an impairment unit.

Referring now to FIG. 3, an impairment unit 320, which may be the impairment unit 120 or 220, may be coupled to the network 190 by two communications links 392, 394. The communications links 392, 394 which may be wires, optical fibers, wireless links, or other communication links. The impairment unit 320 may include a first network interface unit (NIU) 322, a second NIU 328, an impairment engine 330, a port central processing unit (CPU) 325, and a traffic memory 360.

The first NIU 322 may receive electrical, optical, or wireless signals from the network 190 over the communications link 392, and may convert the received signals into incoming traffic 324 in a format usable to the impairment engine 330. Similarly, the second NIU 328 may convert outgoing traffic 326 from the impairment engine 330 into the electrical, optical, or wireless signal format required to transmit the test traffic to the network 190 via the communications link 394.

For ease of discussion, the impairment unit 320 shown in FIG. 3 operates in a half-duplex manner, receiving packets over the communications link 392 and transmitting packet over the communications link 394. An impairment unit may operate in full-duplex manner, providing a bidirectional flow of packets between the communications links 392 and 394. A full-duplex impairment unit may use common hardware to process packets flowing in both directions. A full-duplex impairment unit may use separate hardware to process packets flowing in each direction, or a combination of common and separate hardware.

The impairment engine 330 may accept the incoming traffic 324 from the NIU 322 and may temporarily store incoming packets in the traffic memory 360. The impairment engine 330 may subsequently read stored packets from the traffic memory 360 to form the outgoing traffic 326. The impairment engine 330 may include logic to selectively impair at least some of the packets before transmission. For example, the impairment engine 330 may include logic to delay or reorder selected streams of packets by changing the relative order in which the packets are written into and read from the traffic memory. The impairment engine 330 may include logic to introduce jitter into selected streams of packets by altering the time intervals between transmissions of successive packets in the selected streams. The impairment engine 330 may include logic to impair selected streams by failing to read packets to be dropped from the traffic memory 360 or by reading packets to be duplicated from the traffic memory 360 more than once.

The impairment engine 330 may include a timestamper 335 to associate a timestamp, indicating a time of reception, with each incoming packet. A timestamp may be associated with an incoming packet, for example, by attaching the time stamp to the incoming packet as metadata.

The impairment engine 330 may include a classifier 340 to classify packets within the incoming traffic 324 into a plurality of impairment classes. Each of the plurality of impairment classes may be uniquely associated with a corresponding one of a plurality of impairment profiles stored in a profile memory 350. The term "uniquely associated" means a one-to-one correspondence between impairment classes and impairment profiles. Each impairment profile may define one or more impairments to be applied to packets of the associated class. Each impairment profile may define both types of impairments and one or more parameters defining how each impairment is applied. For example, an impairment profile may define that the packets in the associated class should be delayed by a time period specified in the impairment profile, or that a specified portion of the packets in the associated class should be delayed until one or more subsequently-received packets of the same class have been transmitted (thus causing the packets within the class to be reordered). An impairment profile may define multiple impairments to be applied to a class. For example, an impairment profile may define that 1% of the packets in the associated class are reordered, 0.1% of the packets in the class are duplicated, and bit errors are introduced into 0.01% of the packet in the class. One of the plurality of impairment classes may be a default class for traffic that will not be impaired.

The profile memory 350 may be a contiguous block of memory such as random access memory. The profile memory 350 may be a plurality of registers, latches, or other memory circuits distributed within the impairment engine. The profile memory 350 may be a combination of random access memory, registers, latches, and other memory circuits.

The plurality of impairment profiles may be defined prior to a test session. For example, the plurality of impairment profiles may be defined by a test engineer using a test administrator computing device 310. The impairment profiles may be downloaded to the impairment unit 320 from the test administrator 310 before or during the test session. The plurality of impairment profiles may be stored in the profile memory 350 by the port CPU 325.

The classifier 340 may classify each incoming packet based on the contents of the packet. For example, the classifier 340 may filter or parse the header of each packet and determine the class of each packet based on information such as IP source and destination addresses, source and destination ports, protocol, quality or type of service, and other data that can be extracted from the packet header. However, classifying each packet based on the packet header content may require a substantial amount of processing, particularly since the header content may be modified during transmission though the network. Modifications such as the addition of MPLS (Multi-Protocol Label Switching)labels and/or IP header option or extension fields may move the location of some or all header content with respect to the start of the packet. Thus classifying packets based on header content may require the impairment unit to completely parse the packet header.

The classifier 340 may classify each incoming packet based on information contained in the payload of the packet. For example, the classifier 340 may simply read an impairment class field within the payload of each packet. However, it may be impractical or infeasible to add an impairment class field to the payloads of packets generated by a traffic simulator. In this case, the classifier 340 may determine the impairment class of a packet based on the content of a test information block within the payload of the packet, as described in copending patent application Ser. No. 13/228,291, filed Sep. 8, 2011, which is incorporated herein by reference.

The impairment class determined by the classifier 340 may be used as an index to retrieve the associated impairment profile from the profile memory 350. The impairment engine 330, in conjunction with the traffic memory 360, may then process each packet in accordance with the impairment class of the packet.

It should be understood that the phrase "process each packet" does not mean or imply that every packet is actually impaired. For example, if an impairment profile requires the introduction of bit errors into 0.01% of the packets in a corresponding impairment class, the impairment engine 330 may maintain a count of the received packets in the impairment class and cause a bit error in every $10,000^{th}$ packet. The other packets in the impairment class may be retransmitted from the impairment unit 320 without change.

FIG. 4A, FIG. 4B, and FIG. 4C provide a simplified illustration of a problem that can occur when a portion of incoming network traffic is delayed by an impairment unit. FIG. 4A is a logical block diagram of a simple impairment unit 420. The impairment unit 420 provides for three impairment classes—Class 1, Class 2, and Class 3. Class 1 is not delayed within the impairment unit, Class 2 is delayed by 100 milliseconds (ms), and Class 3 is delayed by 200 ms. The impairment unit 420 may be logically represented by a classifier 440 and three delay lines 460-1, 460-2, and 460-3. In FIG. 4, reference designators with suffixes "-1", "-2", and "-3" refer to elements that process the corresponding traffic class.

The classifier 440 may determine an impairment class for each incoming packet and segregate the incoming traffic into three incoming traffic components 424-1, 424-2, and 424-3, where the suffix indicates the corresponding traffic class. Incoming traffic component 424-1 is routed to delay 460-1, where the incoming stream is not delayed and output as outgoing traffic component 426-1. Incoming traffic component 424-2 is routed to delay line 460-2, where the packets are delayed by 100 ms and output as outgoing traffic component 426-2. Incoming traffic component 424-3 is routed to delay line 460-3, where the packets are delayed by 200 ms and output as outgoing traffic component 426-3. Outgoing traffic components 426-1, 426-2, and 426-3 are then combined, when possible, into outgoing traffic 426.

FIG. 4B and FIG. 4C are graphs of the incoming traffic and outgoing traffic distributions versus time. For ease of explanation, these charts are based on the presumption that there was no incoming or outgoing traffic prior to time=0 or after time=1000. At time=0, incoming traffic is supplied at 100% of line rate. 50% of the incoming traffic at time=0 belongs to impairment class 1 and is segregated into incoming traffic component 424-2. The other 50% of the incoming traffic at time=0 belongs to impairment class 2 and is segregated into incoming component 424-3. Since all of the incoming traffic at time=0 is delayed, there is no outgoing traffic at that time.

At time=100 ms, incoming traffic component 424-2, having been delayed by 100 ms in delay line 460-2, starts being output as outgoing traffic component 426-2. At time=200 ms, incoming traffic component 424-3, having been delayed by 200 ms in delay line 460-3, starts being output as outgoing traffic component 426-3A. From time=200 ms until time=500 ms, the distribution of the incoming traffic and outgoing traffic is constant and both the incoming traffic and the outgoing traffic are at 100% of line rate.

At time=500 ms, the distribution of incoming traffic 424 abruptly changes such that 50% of the incoming traffic at time=500 ms belongs to impairment class 1 (and is segregated into incoming traffic component 424-1) and 50% of the incoming traffic is still in impairment class 2 and segregated into incoming traffic component 424-2. Note that the change in the distribution of the incoming traffic 424 occurs wherever the incoming traffic is generated and is completely outside of the control of the impairment unit 420. Since the incoming traffic component 424-1 is not delayed, it is immediately output from delay line 460-1 as outgoing traffic component 426-1. However, at time=500 ms, delay line 460-3 contains 200 ms of traffic waiting to be transmitted to the network. Thus at time=500 ms, each of the delay lines 460-1, 460-2, and 460-3 demands to output traffic at 50% of line rate, for a total of 150% of line rate. When the total demanded transmit bandwidth exceeds the line rate, the output of the impairment unit may be said to be "oversubscribed".

Since it may be impossible to satisfy all of the demand when an output is oversubscribed, some compromise must be made. For example, the first 200 ms of traffic in incoming traffic component 424-1 could simply be dropped to ensure bandwidth to transmit the 200 ms of traffic remaining in delay line 460-3. Another possible compromise would be to drop the 200 ms of traffic remaining in delay line 460-3. Instead of dropping traffic, the 200 ms of traffic stored in delay line 460-3 could be held in the delay line 460-3 until an indeterminate future time when the output of the impairment unit is not oversubscribed. This traffic may be held in the delay line 460-3 until a change in mix of incoming traffic frees up output bandwidth to allow its transmission. As shown in the example of FIGS. 4B and 4C, incoming traffic drops to zero at time=1000 ms. In response, the output traffic component 426-1 would immediately drop to zero, allowing the traffic trapped in delay line 460-3 to be transmitted (albeit delayed by 700 ms instead of the desired 200 ms) as outgoing traffic component 426-3B. Other compromises could be made. In all cases, 200 ms of traffic will either be dropped or transmitted after an undesired and unpredictable delay.

The example of FIG. 4A-FIG. 4C is exaggerated for ease of understanding. However, when realistic incoming traffic is selectively delayed, duplicated, or reordered within an impairment unit, the output of the impairment unit may become oversubscribed and at least some portion of the traffic may be unexpectedly delayed or dropped. The unexpectedly delayed or dropped packets are an artifact of the testing method. To distinguish between these artifacts and the actual performance of the network under test, an impairment unit may maintain statistics and other data. For example, returning to FIG. 4C, the impairment unit 420 may record and report statistics indicating the number of packets and/or the number of bytes that were dropped and/or improperly delayed (delayed by a time period other than the delay specified in the associated impairment profile). The impairment unit 420 could also maintain a list of the packets that were dropped and or improperly delayed.

Description of Processes

It may be desirable to display or report the transmit bandwidth demand at the output of an impairment unit or other network device. For example, oversubscription of the output of an impairment unit may result in an excessive number of unexpectedly delayed or dropped packets that may compromise or obscure the results of a network test session. A display showing excessive transmit bandwidth demand may, for example, allow a test engineer to adjust test parameters appropriately.

Figure 5:
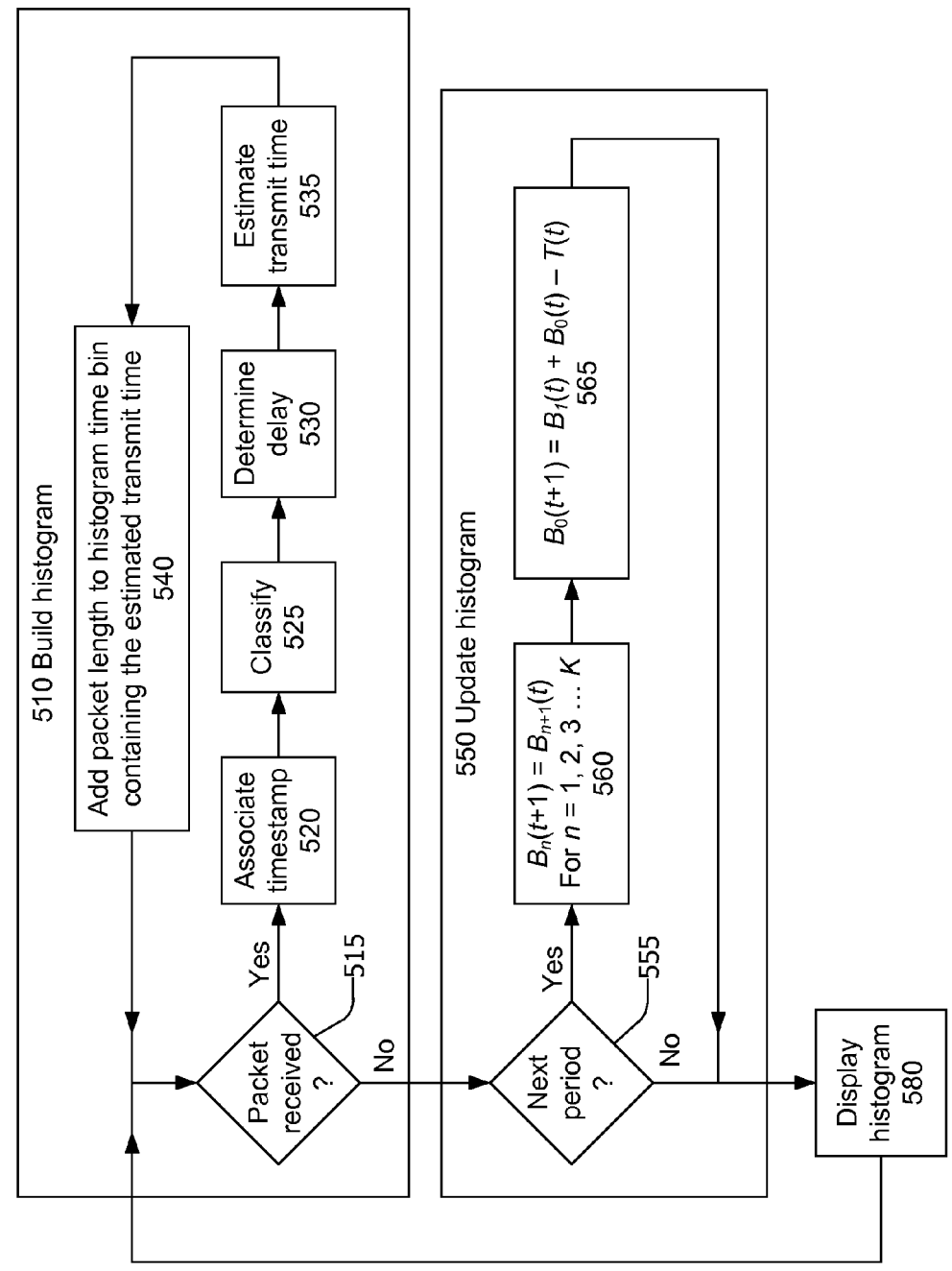
FIG. 5 is a flow chart of a process for measuring and displaying transmit bandwidth contention.

Referring now to FIG. 5, a process 500 for displaying transmit bandwidth demand may be cyclic and continuous in nature. The process 500 may operate continuously during a test session, or may operate upon demand. While the process 500 is shown as a series of sequential actions for ease of explanation, multiple actions may be performed essentially simultaneously or in a pipelined manner. The process 500 may be performed by a processor within an impairment unit, such as the port processor 325 within the impairment unit 320. The process 500 may be performed by test administrator computing device, such as the test administrator 310, using data transferred from an impairment unit 320. The 500 may be performed by an impairment unit and a test administrator computing device working collaboratively.

Figure 6:
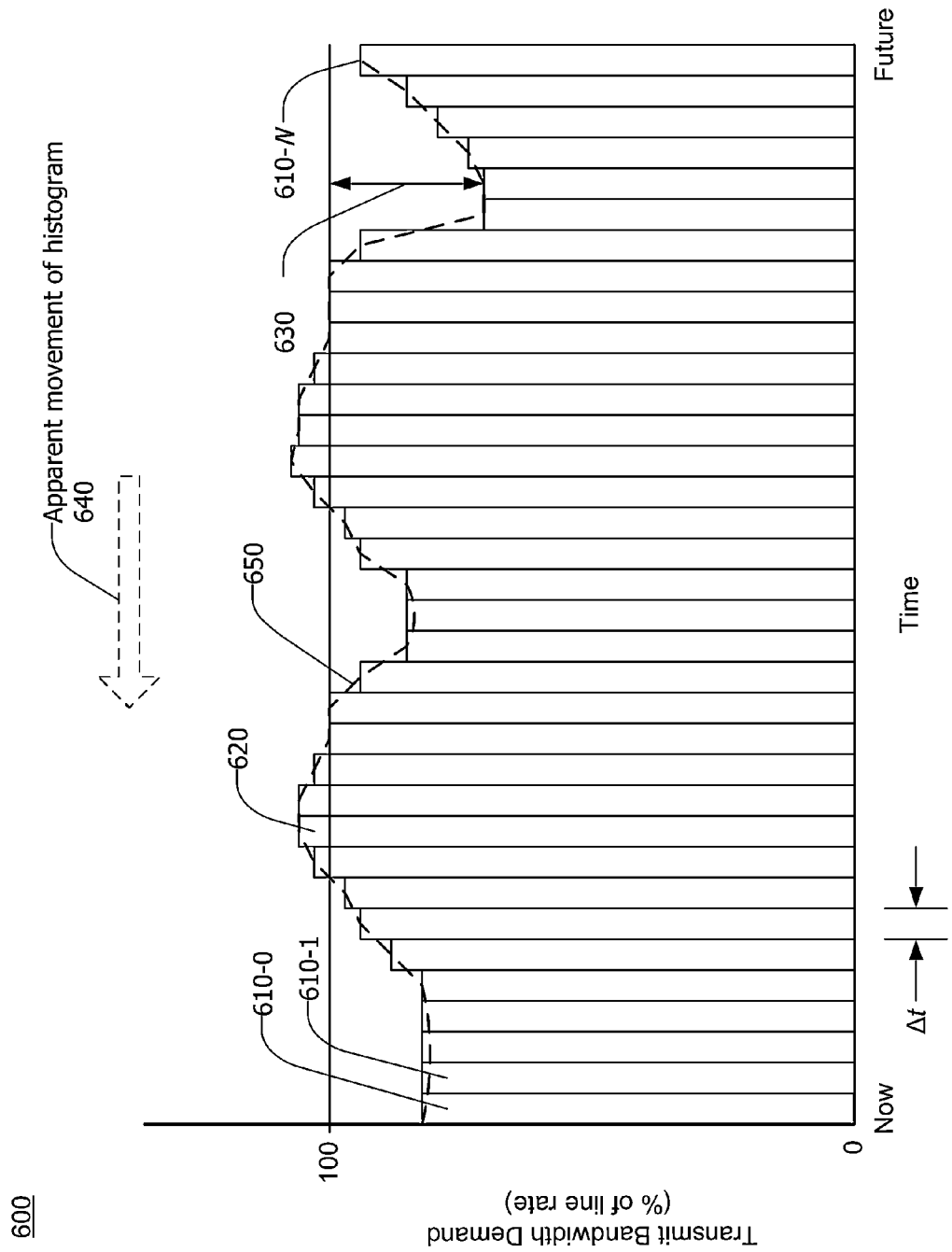
FIG. 6 is an exemplary display presentation showing transmit load.

The process 500 may generate and display a histogram, such as the histogram 600 shown in FIG. 6, showing transmit bandwidth demand as a function of time. The histogram 600 may include a plurality of juxtaposed vertical bars 610-0, 610-1 . . . 610-N. Each vertical bar may represent the transmit bandwidth demand for a respective time interval having a duration $\Delta t$. The left-hand vertical bar 610-0 may represent a time interval containing a current time, and each succeeding vertical bar may represent the next consecutive time interval. The total time period represented by the histogram 600 may be equal to $N\Delta t$.

The height of each vertical bar 610 may represent the transmit bandwidth demand for the corresponding time interval, which may be defined and calculated as the total length of packets scheduled for transmission curing the corresponding time interval. For ease of interpretation, the total length of the scheduled packets may be normalized and displayed as fraction of line rate. Transmit bandwidth demand in excess of 100% of line rate indicates that the transmit bandwidth is oversubscribed. Portions 620 of vertical bars in excess of 100% of line rate may be displayed in a different color, for example, for ease of recognition. Any space 630 between the top of a vertical bar and 100% of line rate indicates unused capacity.

In order for the left-hand vertical bar to contain the current time, the histogram 600 may be updated at the conclusion of each time interval $\Delta t$. The histogram may be updated multiple times during each time interval. Each update may result in the histogram apparently moving to the left, as indicated by the arrow 640.

A histogram may be displayed in a format other than the juxtaposed vertical bars shown in FIG. 6. For example, a histogram may be displayed as a plurality of horizontal bars, with the time axis in the vertical direction, or as a line graph 650, or in some other format.

Referring back to FIG. 5, the process 500 may be described as three sub-processes: building the histogram 510, periodically updating the histogram 550, and displaying the histogram 580. These three sub-processes may be performed sequentially in any order or concurrently. Since all three sub-process may require access to a common memory, the execution of the sub-processes may be synchronized or coordinated to avoid memory access conflicts.

Building the histogram at 510 may include determining if a new packet has been received at 515. If a new packet has not been received, the sub-process 510 may idle until a packet is received, or may pass control to another sub-process. If a new packet has been received, a timestamp indicating a time of reception may be associated with the new packet at 520. The timestamp may be associated with the new packet, for example, by attaching the time stamp to the new packet as metadata.

At 525, the new packet may be classified into one of a plurality of impairment classes. The new packet may be classified into an impairment class based on data contained with a header portion and/or a payload portion of the packet. For example, the impairment class of a packet may be determined at 525 based on the content of a test information block within the payload of the packet.

Each of the plurality of impairment classes may be associated with a corresponding impairment profile. Each impairment profile may indicate the nature and degree of impairments that should be applied to packets within the corresponding impairment class. After the impairment class of the new packet is determined at 525, a delay time for the received packet may be determined at 530. The delay time may be determined based, at least in part, on the impairment profile associated with the impairment class from 525. For example, the impairment profile associated with the impairment class of the new packet may indicate that all packets in the impairment class should be delayed by a predetermined amount, or that a random delay or jitter should be applied to packets in the impairment class, or that selected packets within the impairment class should be delayed such that the packets of the class are re-ordered before transmission. The delay determined at 530 may be a sum of two or more of a predetermined delay, a random delay, and a selective delay. One of the plurality of impairment classes may be a null class for packets that will not be impaired. The delay time for a packet in the null class may be a minimum time required for the impairment unit to receive, classify, and retransmit a packet.

At 535 an estimated transmit time for the new packet may be determined by adding the delay determined at 530 to the received timestamp associated with the new packet at 520. The estimated transmit time may be associated with the new packet as metadata and subsequently used to determine when the new packet should be transmitted.

At 540, the new packet may be "incorporated" into the histogram by adding the length of the new packet to the transmit bandwidth demand for the time interval containing the estimated transmit time from 535. When the impairment profile for the impairment class of the new packet indicates that the new packet should be duplicated, double the length of the new packet may be added to the transmit bandwidth demand for the appropriate time interval. After the new packet is incorporated into the histogram at 540, the sub-process 510 may return to 515 to await the next packet.

Building the histogram at 510 may be performed automatically in near-real time. In this context, "automatically" means "without human involvement" and "near-real time" means "real time except for a processing delay that is small with respect to the duration of each histogram time interval".

Updating the histogram at 550 may include determining if a present time period has expired at 555. If the present time period has not expired, the sub-process 550 may idle until a packet is received, or may pass control to another sub-process. If the present time period has expired, the histogram may be updated to reflect the start of a next time period.

Updating the histogram at the end of each time interval may be done at 560 in accordance with the formula:

$$B_n(t+1) = B_{n+1}(t) \text{ for } n = 1, 2, 3 \ldots K; \quad (1)$$

wherein: $B_n(t)$=Bandwidth demand for time bin n at time=t;
n=an integer time bin number ranging from 0 to K, where time
bin number 0 is the current time bin and K is a positive integer;
t=the time of a most recent update of the histogram; and
t+1=the time of a histogram update immediately following the most recent update.
Bandwidth demand for a given time bin may be equal to the total length of the packets having estimated transmit times falling within that time interval. The update time period, or the actual time difference between t and t+1, may be less than or equal to the time interval $\Delta t$ represented by each bin or vertical bar in the histogram. For example, the displayed histogram time interval $\Delta t$ may be 10 milliseconds and the update time period may be 1 millisecond or 2 milliseconds. The number of time bins K that are updated may be equal to or greater than the number of time bins N that are displayed.

Formula (1) essentially states that, to update the histogram, each time bin is moved one position to the left (as the histogram is shown in FIG. 6). This update does not necessarily require actually moving or recalculating the histogram data. For example, the transmit bandwidth demand values of the plurality of time bins may be stored in a circular buffer having K slots, with a pointer indicating which slot represents the current time period. In this case, all of the values may be shifted by simply modifying the pointer.

Formula (1) effectively assumes that each scheduled packet will be transmitted at the associated estimated transmit time. This assumption is not necessary or appropriate for the current time period. The current time period may be updated at 565 in accordance with the formula:

$$B_0(t+1) = B_1(t) + B_0(t) - T(t), \quad (2)$$

wherein: T(t)=a total length of packets actually transmitted during the time
interval from t to t+1.
In formula (2), the expression $B_0(t) - T(t)$ represents the total length of packets that were scheduled for transmission during time period t but were not actually transmitted. Formula (2) assumes that packets not transmitted during the current time period automatically roll over into the transmit demand for the subsequent time period.

Displaying the histogram at 580 may include displaying a continuously updating histogram. Displaying the histogram at 580 may include displaying, printing, or storing a static histogram representing a particular instant in time. When the number of updated time bins K is greater than the number of displayed time bins N, displaying the histogram at 580 may include selecting a subset of the times bins K and/or aggregating multiple time bins. For example, the update time period in 2 milliseconds, and the displayed time interval is 10 milliseconds, each displayed time bin may represent the sum or average of the transmit bandwidth demand for five time periods. Displaying the histogram at 580 may be interactive. For example, an operator may be able to freeze the display for closer inspection or may be able to change the time domain scale factor.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A method to report transmit bandwidth contention at a network device coupled to a network, comprising:
   building a histogram representing transmit bandwidth demand for a plurality of time bins representing contiguous time intervals of equal duration including a current time bin and plural future time bins;
   displaying the histogram; and
   periodically updating the histogram at a periodicity equal to the duration represented by each of the plurality of time bins in accordance with the formulas:

$$B_0(t+1) = B_0(t) + B_1(t) - T(t), \text{ and}$$

$$B_n(t+1) = B_{n+1}(t) \text{ for } n > 0$$

wherein $B_n(t)$= Bandwidth demand for time bin n at time = t;
   =a total length of packets scheduled for transmission during time bin n;
   n = an integer time bin number ranging from 0 to K, where time bin number 0 is the current time bin and K is a positive integer;
   t =a time of a most recent update of the histogram;
   t+1 = a time of a histogram update immediately following the most recent update; and
   T(t) = a total length of packets actually transmitted during the time period from t to t+1.

2. The method of claim 1, wherein transmit bandwidth demand is represented by a total length of packets scheduled for transmission by the network device during each of the plurality of time bins.

3. The method of claim 2, further comprising:
normalizing the transmit bandwidth demand for each of the plurality of time bin to a line rate.

4. The method of claim 2, wherein building a histogram further comprises:
determining a length and an estimated transmit time for each of a plurality of packets to be transmitted by the network device;
assigning each of the plurality of packets to one of the plurality of time bins based on the respective estimated transmit time; and
summing the lengths of the packets assigned to each of the plurality of time bins.

5. The method of claim 4, wherein determining an estimated transmit time for each packet of the plurality of packets further comprises:
receiving the packet;
attaching a receive time stamp indicating a reception time for the packet;
determining a delay time for the packet; and
adding the delay time to the reception time stamp to determine the estimated transmit time.

6. The method of claim 5, wherein determining a delay time for the packet further comprises:
determining an impairment class of the packet; and
determining the delay time for the packet based on an impairment profile associated with the impairment class.

7. The method of claim 6, wherein determining an impairment class of the packet further comprises:
locating a test information block within a payload of the packet; and
determining the impairment class based on at least a portion of the content of the test information block.

8. A network test system, comprising:
an impairment engine coupled to a network; and
a processor coupled to the impairment engine;
wherein the impairment engine and the processor include circuits and software configured to:
build a histogram representing transmit bandwidth demand for a network device for a plurality of time bins representing contiguous time intervals of equal duration including a current time bin and plural future time bins;
display the histogram; and
periodically update the histogram at a periodicity equal to the duration represented by each of the plurality of time bins in accordance with the formulas:

$$B_0(t+1)=B_0(t)+B_1(t)-T(t), \text{and}$$

$$B_n(t+1)=B_{n+1}(t) \text{ for } n>0$$

wherein $B_n(t)$= Bandwidth demand for time bin n at time = t;
=a total length of packets scheduled for transmission during time bin n;
n = an integer time bin number ranging from 0 to K, where time bin number 0 is the current time bin and K is a positive integer;
t =a time of a most recent update of the histogram;
t+1 = a time of a histogram update immediately following the most recent update; and
$T(t)$ = a total length of packets actually transmitted during the time period from t to t+1.

9. The system of claim 8, wherein transmit bandwidth demand is represented by a total length of packets scheduled for transmission by the network device during each of the plurality of time bins.

10. The system of claim 9, wherein the transmit bandwidth demand for each time bin is normalized to a line rate.

11. The system of claim 9, wherein, to build the histogram, the impairment engine and the process are configured to:
determine a length and an estimated transmit time for each of a plurality of packets to be transmitted by the network device;
assign each of the plurality of packets to one of the plurality of time bins based on the respective estimated transmit time
sum the lengths of the packets assigned to each of the plurality of time bins.

12. The system of claim 11, wherein, to determine an estimated transmit time for each packet, the impairment engine and the processor are further configured to:
receive the packet;
attach a receive time stamp indicating a reception time for the packet;
determine a delay time for the packet;
add the delay time to the reception time stamp to determine the estimated transmit time.

13. The system of claim 12, wherein, to determine a delay time for the packet, the impairment engine and the processor are further configured to:
determine an impairment class of the packet; and
determine the delay time for the packet based on an impairment profile associated with the impairment class.

14. The system of claim 13, wherein, to determine an impairment class of the packet, the impairment engine and the processor are further configured to:
locate a test information block within a payload of the packet; and
determine the impairment class based on at least a portion of the content of the test information block.

* * * * *